Jan. 8, 1935.  F. E. CHESTERMAN  1,987,432
TRUSS
Filed Jan. 22, 1932  3 Sheets-Sheet 1
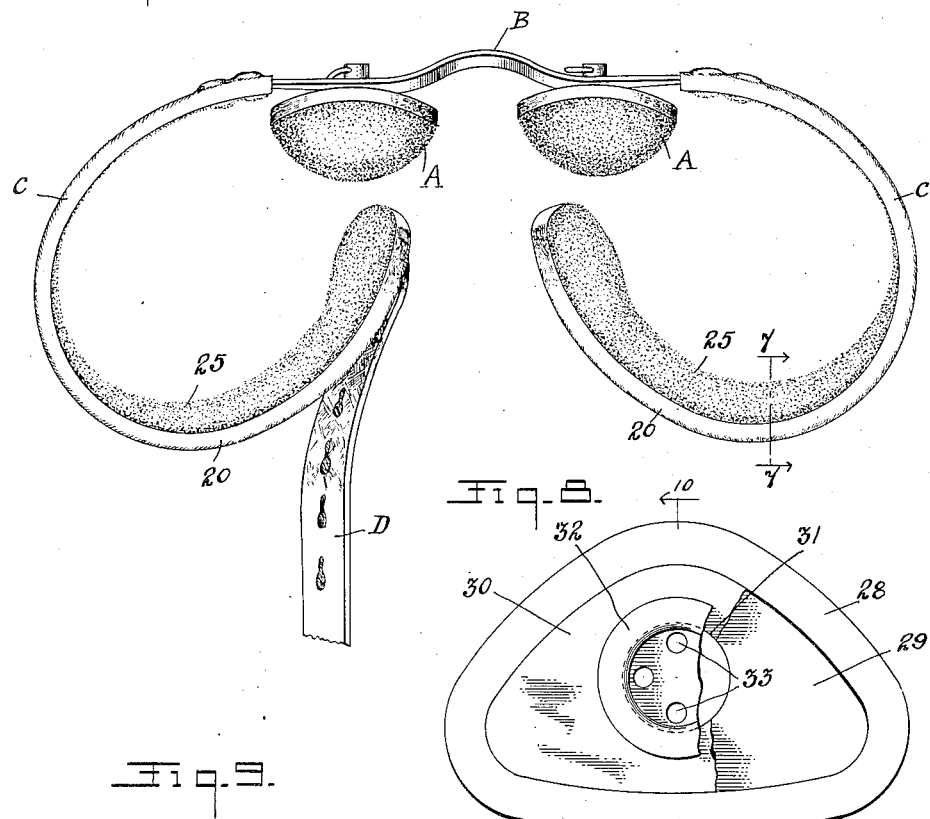
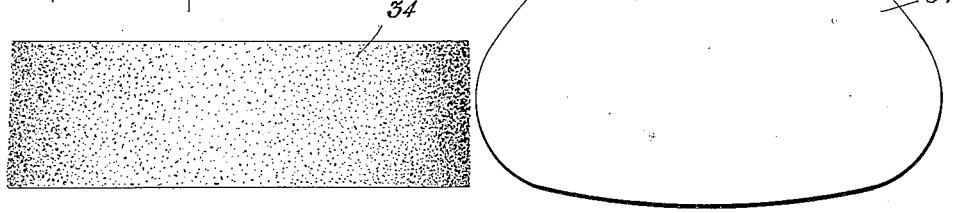

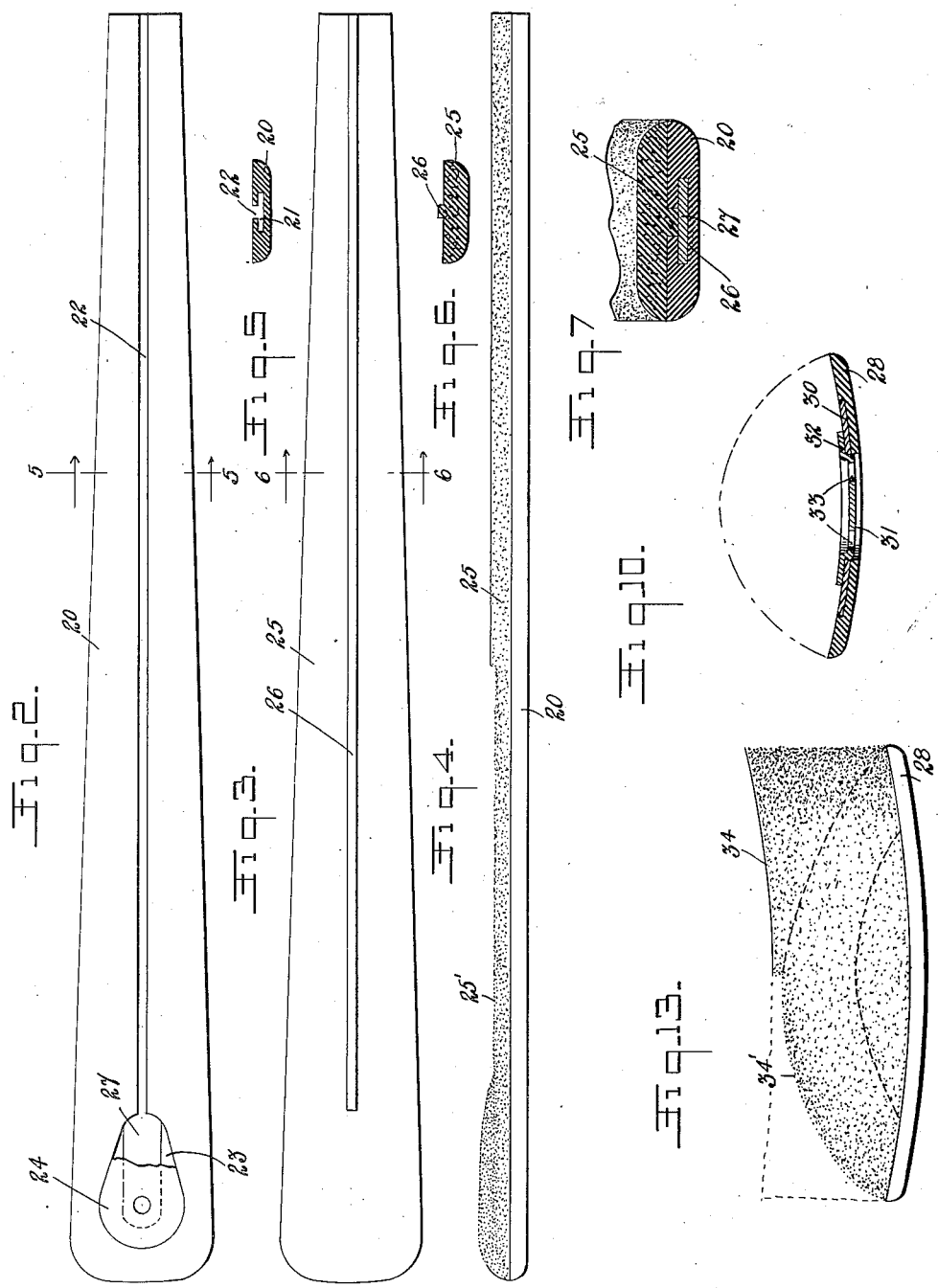

Jan. 8, 1935.　　　　F. E. CHESTERMAN　　　　1,987,432
TRUSS
Filed Jan. 22, 1932　　　3 Sheets-Sheet 3
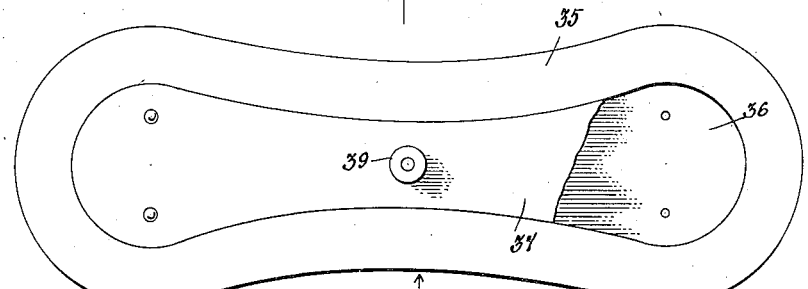
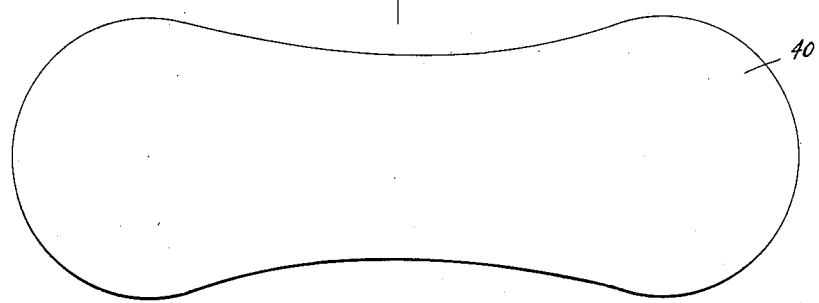
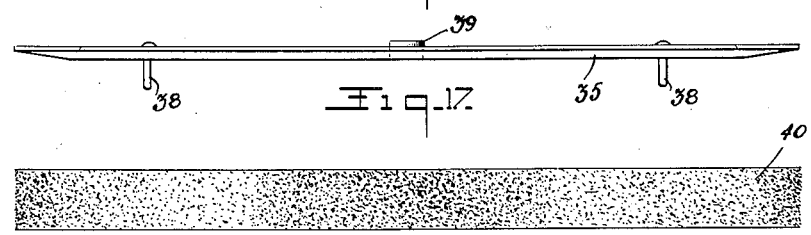
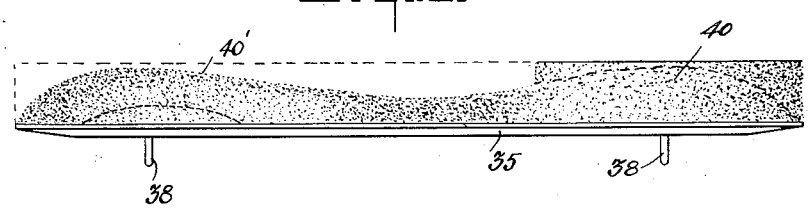
WITNESSES
INVENTOR
Frank E. Chesterman
BY
Joshua R. H. Potts
HIS ATTORNEY Patented Jan. 8, 1935

1,987,432

UNITED STATES PATENT OFFICE 1,987,432

TRUSS

Frank E. Chesterman, Noble, Pa.

Application January 22, 1932, Serial No. 588,053

6 Claims. (Cl. 128—95)

This invention relates to trusses, and has for an object to provide a device of the class, and the method of making the same, whereby an article more comfortable to wear is produced.

A further object of the invention is to substitute rubber of different consistencies in the making of a truss as compared to the materials now well known in the art.

A further object of the invention is to provide a truss, the various parts necessary for the proper tension and application, all covered on the contacting side with rubber, or like material, of the consistency generally known as "sponge rubber".

A further object of the invention is to provide the method of making a truss whereby an elastic rubber, or like material, is employed to receive the metallic parts and a sponge rubber, or the like, covering the elastic rubber and the metallic parts and forming the personal contact surfaces.

A further object of the invention is to provide an elastic rubber having recesses molded therein at the time of making, properly contoured to receive metallic parts, and sponge rubber, or like material, molded or cut from sheet or other bulk cemented or vulcanized to the elastic rubber and ground to the proper contour for ease of contact to the person, or merely for the purpose of removing the "skin" if molded.

The invention therefore comprises the step in the method of making and the article comprising an elastic rubber material having recesses formed therein, with metallic or like material introduced into the recesses so formed by molding, and the applying of a sponge rubber to enclose the metallic parts and present a cushioning material, said sponge rubber or like material being by a step of the process treated to eliminate all corners and present a soft and rounded surface for contact with the person.

The drawings illustrate embodiments of the invention, and the views therein are as follows:

Figure 1 is a view in elevation of a truss, embodying the present invention and made by the present process, Figure 2 is a view in elevation of the elastic rubber, or like material, molded to receive the metallic spring, Figure 3 is a view in elevation of the sponge rubber member to be applied to the elastic member, shown at Figure 2, Figure 4 is a view in edge elevation of the member shown at Figures 2 and 3 combined, and throughout a part of its length shown as ground or otherwise formed to rounded condition, Figure 5 is a transverse sectional view, taken on line 5—5 of Figure 2, Figure 6 is a transverse sectional view, taken on line 6—6 of Figure 3, Figure 7 is a transverse sectional view, through the completed article, more particularly shown at line 7—7 of Figure 1, Figure 8 is a view in elevation of the elastic part of one of the hernia engaging pads, showing a fragment of the metallic plate embedded therein, and a fragment of the disk seated in the orifice in the plate, Figure 9 is a view in edge elevation of the pad member shown at and as indicated by arrow 9 at Figure 8, Figure 10 is a transverse sectional view taken through the pad member as indicated by line 10—10 at Figure 8, Figure 11 is a view in plan of the sponge blank, Figure 12 is a view in edge elevation of a sponge blank from which by grinding the pad may be shaped, Figure 13 is a view in edge elevation of the pad showing the sponge pad cushioning member applied to the elastic member and in part ground to form a rounded contacting surface, Figure 14 is a view in plan of the elastic member of the back pad, with a fragment of the metallic plate therein, Figure 15 is a view of the sponge rubber cushion in elevation, Figure 16 is a view of the elastic member in edge elevation, as indicated by arrow 16 at Figure 14, with the metallic plate therein, and the accompanying staples and boss, Figure 17 is a view in edge elevation of the sponge rubber cushion employed under some circumstances, and Figure 18 is a view in edge elevation of the back pad comprising the cushion and elastic member, showing the cushion member as being partly ground away to form a rounded cushioning contacting surface.

Like characters of reference indicate corresponding parts throughout the several views.

The improved truss, which forms the subject-matter of this application, is in its general form, substantially similar to trusses now well known as the anatomy and positions of the hernia make it essential that such forms shall be substantially standardized. As shown at Figure 1, two similar pads A are shown connected by a metallic brace B. Means for holding the pads, one or both, in engagement with the hernia comprise spring members C which partially encircle the person and bear against the back. As shown at Figure 1 also, a strap D is provided for connecting the ends of the spring members C when found necessary or desirable. The spring members C are substantially constant in their form, but the pads A vary in accordance with the position of the hernia, and other anatomical characteristics. In the drawings, there have been shown two types of these pads, but the invention is in no way limited to the forms as shown.

The parts of the truss are built up upon the one side of elastic relatively smooth rubber material, and on the opposite side a sponge rubber material, the latter side being that which makes contact with the person.

While at the present time rubber, both for the exterior and interior surfaces is indicated as the desirable material, it will be understood that the invention is not limited to rubber, but includes any materials which now or hereafter present the physical characteristics necessary to provide the structure aimed at. In this specification and claims, the word "rubber" will be employed, therefore, as indicating in the broader sense any material having said physical characteristics.

The spring members C comprise the outer section 20 of rubber material which is herein referred to as "elastic". Referring to this quality of the rubber as "elastic", does not negative elastic properties resident in the sponge rubber, but the spronge rubber of obviously lesser density is provided for a different purpose and the elasticity is, therefore, of less importance. The elastic rubber 20 is of smooth closely grained consistency which is capable of being washed or cleansed for sanitary purposes. The elastic member 20 is constructed by molding in the usual manner well known in the manufacture of rubber articles and is provided with an elongated recess 21, (see Fig. 5) with a communicating slot 22.

The communicating slot 22 is merely a resultant of the form over and upon which the member 20 is molded, it being necessary to support a form to produce the recess 21, and such form is supported through the slot 22. The form also produces a recess 23 at the larger or wider end of the member 20. This recess 23 is undercut to receive the metallic plate 24 and is of such dimension and contour as to receive the plate wholly therein.

The cushioning member 25 is preferably molded to form, but may be die-cut from sheet material and in either case is of the consistency known as sponge rubber. It is cut, if cut, to the proper dimension to correspond to the shape of the member 20. Upon this die-cut strip of material 25, a narrow rib 26 is secured in any approved manner as by cementing so that it becomes an integral part of this member. The cushioning member is, however, preferably molded to the desired form, but whichever way it is produced it is inverted from the position shown at Figure 3 so that the rib 26 is enclosed within the slot 22, proper cement or other attaching material having been previously applied thereto to retain the two members 20 and 25 in a unitary structure, shown more particularly in transverse section at Figure 7. When this part is applied, however, the spring member 27, shown at Figure 7, is not then in position, but is inserted later, that is to say, after the proper union of the parts 20 and 25 has been effected. This spring member 27 is attached to the metallic plate 24 by any attaching members found desirable.

In practice, the attaching means thus employed, will also serve to engage the key-hole slots of the strap D. The opposite ends of the spring member 27 will be secured by rivets, or the like, to the brace B, shown at Figure 1.

The pads A, as has been previously noted, will be of the contour required or desired for the proper application to the hernia. At Figures 8 to 13 inclusive, the contour and make-up of one type of pad is shown. The pads will preferably be molded to the several forms shown, or to such other forms as may be necessary or desirable for use.

This comprises an elastic member 28 having a recess 29 formed therein, for the receipt of a metallic plate 30 (see Fig. 8). This metallic plate 30 has an orifice 31 formed therein for the receipt of a disk 32. This is merely one form of various commonly employed means of attaching to the brace B, as perforations 33 are shown in the disk 32 for the receipt of bolts, screws or rivets, as the attaching may make desirable. In any event, the plate 30 is wholly contained within the recess 29 of the elastic member which is preferably undercut to hold the plate. This arrangement is shown in transverse section at Figure 10.

The cushioning member 34 is preferably molded to form but may be cut from a sheet of relatively thick sponge rubber, and is applied to the structure shown at Figure 8 and secured thereto by any cementitious or adhesive material so that it assumes the form shown at Figure 13. Figure 13 shows the ultimate form and the manner of grinding from a bulk piece. The part indicated as 34' has been properly contoured as molded or ground away by abrasion to the desired arcuate rounded form for comfort.

Under certain conditions, the back pad is found desirable supplemental to the strap D and spring members C. Such a back pad member is shown at Figures 14 to 18 inclusive, with steps in its construction. It comprises an elastic member 35, having an undercut recess 36 formed therein for the receipt of the metallic reinforcing plate 37. This reinforcing plate is provided with means for attaching, such for instance, as the staples 38 and a boss 39, either or all of which may be employed as contingencies may make necessary or desirable.

The cushioning member 40, like the other cushions will preferably be molded to form, but may be die-cut from a sheet of sponge rubber, and in either case is applied to the elastic member shown at Figure 14 and secured as above noted by cementitious or adhesive material, the combination being shown at Figure 18 with the part at 40' indicating the completed form which may be produced by molding or may be ground away to produce the desired rounded contours.

In each of the cases outlined, the so-called "elastic rubber" material is that part which, in wear, is remote from the body and the so-called "sponge rubber" part is that part in engagement with the body.

Sponge rubber, when molded, is always provided with an outer coating, technically referred to as "skin". This skin is not desirable as a body contacting part, and is, therefore, ground away to complete the article. The article is, therefore, completed by grinding after the sponge rubber and the elastic rubber have been united, whether it be to grind away the skin as in the sponge rubber or a major part of the bulk as in the blanks cut from sheets.

The die-cut sponge rubber, of course, presents corners and plane surfaces which are not desired for body contacting parts in such a structure, and after the sponge rubber parts have been attached to the elastic parts, with the enclosed metallic parts, the sponge rubber is subjected to an abrading step, whereby the corners and plane surfaces are ground to rounded contours for comfort in wearing.

Also, as will be noted from the drawings, the elastic or outer parts are formed rounded for the purpose of making these parts less objectionable through excessive wear of clothing.

The necessary connections or accessories to accommodate the structure to various persons, also the various shapes of the pads necessary under varying conditions will be thoroughly understood by one skilled in the art, and only examples of the various structures have been disclosed in the present application, and it is to be understood that the invention is in no way limited to form of any of the parts shown which may be varied in size with the requirements and that the invention is directed to the formation of the parts of the contour required with the sponge rubber contacting surface, the cleanable elastic rubber remote surface, and the necessary inlaid metallic or other reinforcing parts for the purpose of retaining the shapes of the rubber parts, and that all of such parts may be varied as circumstances may make necessary or desirable.

The invention is hereby claimed as follows:

1. A truss unit comprising adhesively connected opposite side coverings, one of sponge rubber and one of rubber of greater density than the sponge rubber, the side covering of greater density having a recess therein with marginal overhangs stopping short of abutment, and a member of rigid material seated in the recess, the sponge rubber covering being provided with a part occupying the space between the overhangs.

2. A truss comprising opposite side coverings, one of sponge rubber and one of rubber of greater density than the sponge rubber, the side covering of greater density having a recess therein with marginal overhangs, a member of rigid material seated in the recess and engaged under the overhangs, the sponge rubber being adhesively connected to the overhangs and enclosing said member.

3. A truss comprising opposite side coverings, one of sponge rubber and one of rubber of greater density than the sponge rubber, the side covering of greater density having a recess therein with marginal overhangs, a member of rigid material seated in the recess and with its margins only engaged under the overhangs, the sponge rubber being adhesively connected to the overhangs and enclosing said member.

4. A truss comprising opposite side coverings, one of sponge rubber and one of rubber of greater density than the sponge rubber, the side covering of greater density having a recess therein with marginal overhangs, a member of rigid material seated in the recess and engaged under the overhangs, said overhangs stopping short of abutment, the sponge rubber being adhesively connected to the overhangs and enclosing said member.

5. A truss comprising opposite side coverings, one of sponge rubber and one of rubber of greater density than the sponge rubber, the side covering of greater density having a recess therein with marginal overhangs, a member of rigid material seated in the recess and engaged under the overhangs, said overhangs stopping short of abutment, the sponge rubber being adhesively connected to the overhangs and enclosing said member and filling the space between the edges of the overhangs.

6. A truss comprising opposite side coverings, one of sponge rubber and one of rubber of greater density than the sponge rubber, the side covering of greater density having a recess therein with marginal overhangs, a member of rigid material seated in the recess and with its margins only engaged under the overhangs, said overhangs stopping short of abutment, the sponge rubber being adhesively connected to the overhangs and enclosing said member and filling the space between the edges of the overhangs.

FRANK E. CHESTERMAN.